Aug. 13, 1940.  V. P. SHELTON  2,210,988
CAMERA
Filed Dec. 4, 1939
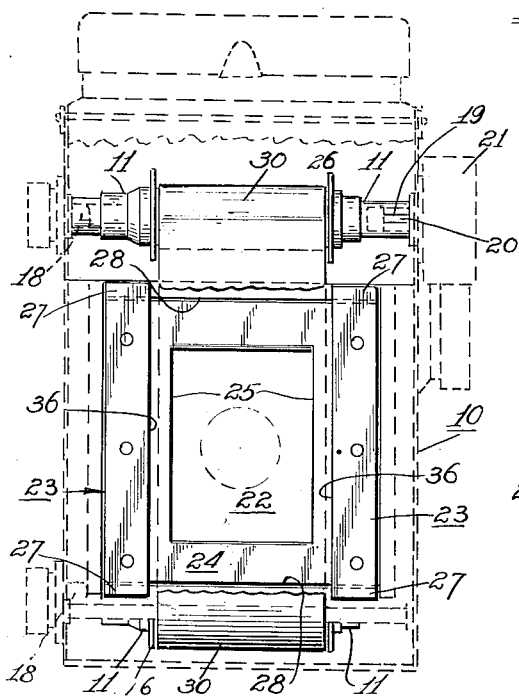
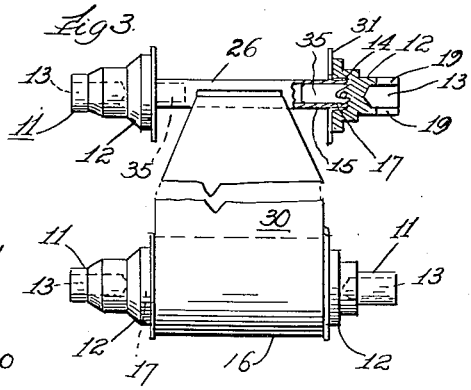
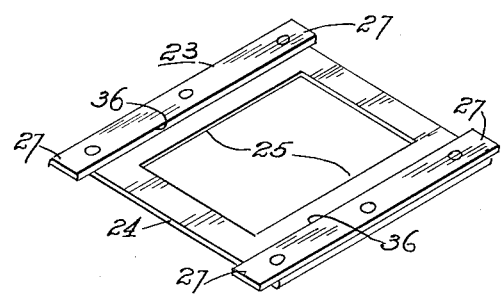
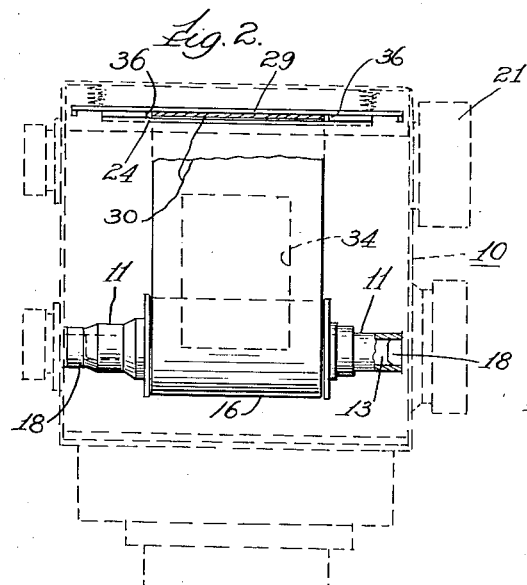
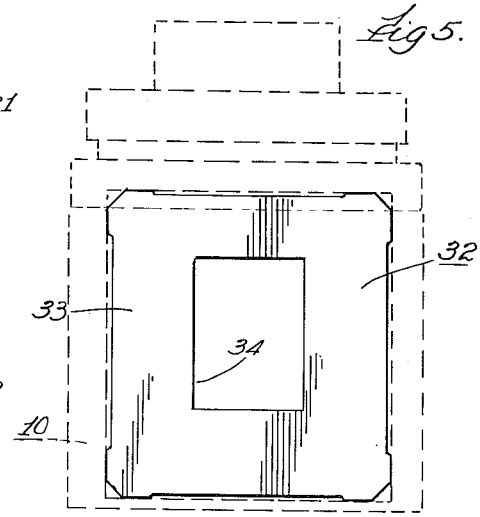
Inventor
Vernon P Shelton
by James R. McKnight
his Atty.

Patented Aug. 13, 1940

2,210,988

UNITED STATES PATENT OFFICE 2,210,988

CAMERA

Vernon P. Shelton, Chicago, Ill.

Application December 4, 1939, Serial No. 307,408

2 Claims. (Cl. 95—31)

It is well known that color film is expensive and for this reason is preferred in Bantam or 828 size. Kodachrome film is not made to fit such 120 cameras giving 2¼ inch square pictures, as the Rolleiflex, Rolleicord, Voightlander Superb, Karelle Reflex and the Super Iconta B.

It is among the objects of this invention to provide means which when used in combination with said 120 cameras giving 2¼ inch square pictures that they may successfully use Bantam or 828 size color film. My invention contemplates such other objects, advantages and capabilities as will later more fully appear and which are inherently possessed by my invention.

While I have shown in the accompanying drawing a preferred form of my invention, yet I wish it understood that the same is susceptible of modification and change without departing from the spirit of my invention.

Referring to the drawing, Fig. 1 is an elevational view of a camera interior in combination with adapters, Bantam spools and exposure chamber mask; Fig. 2 is a bottom view of the structure shown in Fig. 1; Fig. 3 is a detail view of the adapters and film spool assembly; Fig. 4 is a detail view of the mask, and Fig. 5 is a plan view of the finder mask in place on the ground glass of a reflector camera.

In the embodiment selected to illustrate my invention I remove the ordinary film supply spool from the engaging members of the 120 camera adapted to produce 2¼ inch square pictures, which camera I designate by the numeral 10, and provide a pair of removable spool adapters 11. Each adapter 11 has a body portion 12 with a recess 13 extending from one end to the interior of the body member. Extending from the other end of said body member 12 is an extension 35. A shallow circular depression 14 is provided in the body member 12 adjacent the inner ends of the extension 35. The two adapters 11 are positioned with their extensions 35 within opposite receiving holes 15 of the Bantam size spool 16, the spaced flanges 17 of said spool 16 being positioned within the circular depressions 14. The knobs 18 of the camera 10 are removably fitted within recesses 13 of adapters 11. Bantam size spool 16 is of sufficient width to accommodate Bantam size film, which is commonly referred to as 828 film or in color as Eastman Bantam Kodachrome film.

The ordinary take-up spool is also removed from said 120 camera 10, and said adapters 11 removably fitted to knobs 18, as heretofore described, to hold another Bantam size spool 26. One of the adapters 11 is provided with a lateral slot 19 to engage key 20 attached to knob 18 so that the turnable member 21 of the camera may be manually turned to move the film.

Over the exposure chamber 22 of said 120 camera 10 I provide a mask 23 having a frame 24 with an opening 25 adapted to provide a smaller exposure for the film to produce smaller size pictures than the 2¼ inch square pictures ordinarily produced by the 120 camera, said smaller sized pictures may be Bantam sized or 35 millimeter—as desired.

Attached to said frame 24 of my compensating or reducing mask 23 and extending longitudinally are a pair of spaced guides 36 for the Bantam spool 16. Said guides 36 extend beyond the frame 24 and their end portions 27 support the mask 23 on the frame edges 28 of the exposure chamber 22. The mask 23 is held in place by the pressure plate 29 on the back of the camera 10.

The Bantam film 30 extends from the supply spool 16 through guides 36 over opening 25 of mask 23 to the take-up spool 26.

A finder mask 32 is also positioned over the ground glass of a reflector camera, as shown in Fig. 5. A corresponding mask would correspondingly fit over the view finder of a direct view finder camera. The mask 32 has a frame 33 and an opening 34 which limits the finding vision to substantially the proportionate size of the picture to be obtained.

With my removable adapting members an ordinary 120 camera adapted to take 2¼ inch square pictures may be adapted to use color film of Bantam size. No structural changes in said 120 camera are necessary, said adapting members are all removable so that when their use is no longer desired the user may remove them without damage to his 120 camera and use the camera for its original purposes. The 120 camera may with my adapting members produce color film exposures economically and accurately and of a desired small size.

Having thus described my invention, I claim:

1. In combination with a reflex camera normally adapted to produce 2¼ inch square pictures, said camera having knobs for holding film supply and take up spools, one of said knobs being connected with a mechanism for determining the length of film to be taken up on each exposure, an exposure chamber provided with a film exposure space and frame edges, and a ground glass view finder, a removable adapting set to adapt said camera for the use of miniature size color film to obtain color film exposures, said adapting set comprising four adapters, each of said adapters having a body portion with a recess extending within one end and an extension extending from the other end, the recesses of two of said adapters adapted to removably receive the film supply knobs of the camera, the recesses of the other two of said adapters adapted to removably receive the film take up knobs of the camera, the extensions of said adapters adapted to removably fit within the recesses of a miniature size film supply and take up spool, the adapter attached to said take up spool knob which is attached to said take-up mechanism having a slot, said slot adapted to removably receive a key provided in said camera take-up spool knob so that said knob may turn said adapter and said film take-up spool, a film mask having a frame, said film mask being removably positioned in said exposure chamber over said exposure space, said film mask having a pair of guide members attached to opposite spaced portions of the frame, said guide members extending parallel to the direction of the film movement and adapted to receive between them and guide miniature film extending from a film spool attached to the extensions of said adapters which are attached to the film supply knobs of said camera to a take-up spool attached to the extensions of said adapters which are attached to the take-up knobs of said camera, said guide members having end portions extending beyond the frame and adapted to support the film mask on the frame edges of the exposure chamber, a view finder mask having a frame, the size of the frame of said view finder mask being identical with that of said film mask, and said film mask providing an exposure space of substantially the same length as the amount of film supplied or taken up on each exposure by the action of said camera knob and camera mechanism and the adapter attached thereto.

2. In combination with a camera normally adapted to produce pictures of a size larger than miniature size color film pictures, said camera having knobs for holding film supply and take-up spools, one of the knobs for holding said take-up spool being connected with a mechanism for determining the length of film to be taken up for each exposure, an exposure chamber provided with an exposure space and a view finder, a removable adapting set to adapt said camera for the use of miniature size color film to obtain color film exposures, said adapting set comprising four adapters, each of said adapters having a body portion with a recess extending within one end and an extension extending from the other end, the recesses of two of said adapters adapted to removably receive the film supply knobs of the camera, the recesses of the other two of said adapters adapted to removably receive the film take-up knobs of the camera, the extensions of said adapters adapted to removably fit within the recesses of a miniature size film supply and take-up spool, a film mask having a frame, said film mask being removably positioned in said exposure chamber over said exposure space, said film mask having a pair of guide members attached to opposite spaced portions of the frame, extending portions on said mask for supporting said mask in said frame, said guide members extending parallel to the direction of the film movement and adapted to receive between them and guide miniature film extending from a film spool attached to the extensions of said adapters which are attached to the film supply knobs of said camera to a take-up spool attached to the extensions of said adapters which are attached to the take-up knobs of said camera, a view finder mask having a frame, the size of said frame being of a size in the same proportion that the view finder of said camera bears to the exposure space of said camera and said film mask providing an exposure space of substantially the same length as the amount of film supplied for each exposure by said camera spool knob, adapter and take-up spool.

VERNON P. SHELTON.